(12) United States Patent
Chen et al.

(10) Patent No.: US 8,418,926 B2
(45) Date of Patent: Apr. 16, 2013

(54) SMART CARD WITH E-PAPER DISPLAY

(75) Inventors: Ping-Hei Chen, Taipei (TW); Da-Sheng Lee, Taipei (TW); Ying-Chen Lin, Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 0 days.

(21) Appl. No.: 12/772,236

(22) Filed: May 3, 2010

(65) Prior Publication Data

US 2011/0226859 A1 Sep. 22, 2011

(30) Foreign Application Priority Data

Mar. 22, 2010 (TW) ............................... 99108362 A

(51) Int. Cl.
*G06K 7/00* (2006.01)
(52) U.S. Cl.
USPC .......................................... 235/487; 235/492
(58) Field of Classification Search .................. 235/487, 235/492

See application file for complete search history.

(56) References Cited

U.S. PATENT DOCUMENTS

| 6,223,990 B1 * | 5/2001 | Kamei ........................... 235/492 |
| 7,270,276 B2 * | 9/2007 | Vayssiere ....................... 235/492 |
| 2008/0035741 A1 * | 2/2008 | Sakama ......................... 235/492 |
| 2010/0163616 A1 * | 7/2010 | Phillips et al. ................. 235/380 |

* cited by examiner

*Primary Examiner* — Michael G Lee
*Assistant Examiner* — Matthew Mikels

(57) ABSTRACT

A smart card suitable for receiving data and electric power from a far-end reader/writer wirelessly is provided. The smart card includes a main body, an e-paper, an e-paper driver, a RFID tag chip and a receiving unit. The e-paper is disposed at the main body. The e-paper driver is disposed at the main body and electrically connected to the e-paper. The RFID tag chip is disposed at the main body and electrically connected to the e-paper driver. The receiving unit is disposed at the main body and electrically connected to the e-paper driver and the RFID tag chip. The receiving unit receives the data and the electric power wirelessly for transferring the electric power to the e-paper driver and transferring the data to the e-paper driver through the RFID tag chip. The e-paper driver drives the e-paper to display information by the data and the electric power.

3 Claims, 1 Drawing Sheet

SMART CARD WITH E-PAPER DISPLAY

CROSS-REFERENCE TO RELATED APPLICATION

This application claims the priority benefit of Taiwan application serial No. 99108362, filed on Mar. 22, 2010. The entirety of the above-mentioned patent application is hereby incorporated by reference herein and made a part of this specification.

BACKGROUND

1. Field of the Disclosure

The present disclosure relates to a smart card. More particularly, the present disclosure relates to a smart card having an e-paper.

2. Description of Related Art

A smart card is an integrated circuit (IC) chip having components such as a microprocessor, a card operating system, a security module and a memory, etc., which allows a holder to execute a predetermined operation. The smart cart provides function of calculation, encryption, two-way communication and security, so that besides the function of storing data, the smart card also has a function of protecting the data stored therein. Many smart cards do not have a display function, and information stored therein has to be first read by a far-end read and then displayed on a screen of the reader for a user to view, so that it is inconvenient for obtaining the information stored in the smart card.

Moreover, most of current train/bus tickets or movie tickets are disposable tickets, which may lead to a waste of paper and ink. If the smart card is designed to have the display function, information such as date, a vehicle number (a movie timetable) and a seat number, etc. can be displayed on the card, and the card can be repeatedly used to replace the tickets such as the train/bus tickets or the movie tickets that are abandoned after use, so as to save resources to avail environmental protection.

SUMMARY

The present disclosure is directed to a smart card, which has an e-paper used for display information.

The present disclosure provides a smart card suitable for receiving data and electric power from a far-end reader/writer wirelessly. The smart card includes a main body, an e-paper, an e-paper driver, a radio frequency identification (RFID) tag chip and a receiving unit. The e-paper is disposed at the main body. The e-paper driver is disposed at the main body and is electrically connected to the e-paper. The RFID tag chip is disposed at the main body and is electrically connected to the e-paper driver. The receiving unit is disposed at the main body and is electrically connected to the e-paper driver and the RFID tag chip. The receiving unit receives the data and the electric power wirelessly for transferring the electric power to the e-paper driver and transferring the data to the e-paper driver through the RFID tag chip. The e-paper driver drives the e-paper to display information by the data and the electric power.

In an exemplary embodiment of the present disclosure, the smart card further includes a booster electrically connected to the receiving unit for boosting the electric power.

In an exemplary embodiment of the present disclosure, the receiving unit includes a first antenna and a second antenna. The first antenna is electrically connected to the e-paper driver, wherein the first antenna receives the electric power wirelessly, and transfers the electric power to the e-paper driver. The second antenna is electrically connected to the RFID tag chip, wherein the second antenna receives the data, and transfers the data to the e-paper driver through the RFID tag chip.

In an exemplary embodiment of the present disclosure, the smart card further includes a booster electrically connected to the first antenna for boosting the electric power.

In an exemplary embodiment of the present disclosure, the first antenna is suitable for receiving an electromagnetic wave having a first frequency, and the second antenna is suitable for receiving an electromagnetic wave having a second frequency, and the first frequency is different to the second frequency.

In an exemplary embodiment of the present disclosure, the main body has an opening for exposing the e-paper.

According to the above descriptions, the smart card of the present disclosure can receive data and electric power wirelessly from the far-end reader/writer through the receiving unit, so as to power the e-paper of the smart card, and drives the e-paper to display information according to the data, so that the user can directly view the smart card to obtain the information therein. In this way, the smart card of the present disclosure can be used to replace tickets such as train/bus tickets or movie tickets that are abandoned after use, so as to save resources to avail environmental protection.

In order to make the aforementioned and other features and advantages of the present disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
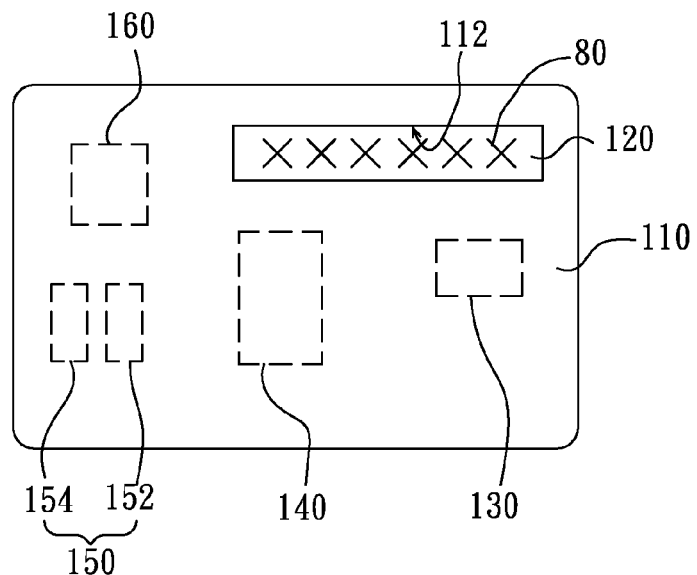
FIG. 1 is a top view of a smart card according to an exemplary of the present disclosure.

FIG. 1 is a top view of a smart card according to an exemplary of the present disclosure. Referring to FIG. 1, the smart card 100 of the present exemplary embodiment includes a main body 110, an e-paper 120, an e-paper driver 130, a radio frequency identification (RFID) tag chip 140 and a receiving unit 150. The main body 110 is used for carrying and masking the e-paper 120, the e-paper driver 130, the RFID tag chip 140 and the receiving unit 150. The main body 110 has an opening 112 for exposing the e-paper 120, so that a user can view information displayed on the e-paper 120 through the opening 112. Connections and functions of the e-paper 120, the e-paper driver 130, the RFID tag chip 140 and the receiving unit 150 are described below with reference of FIG. 2.

Figure 2:
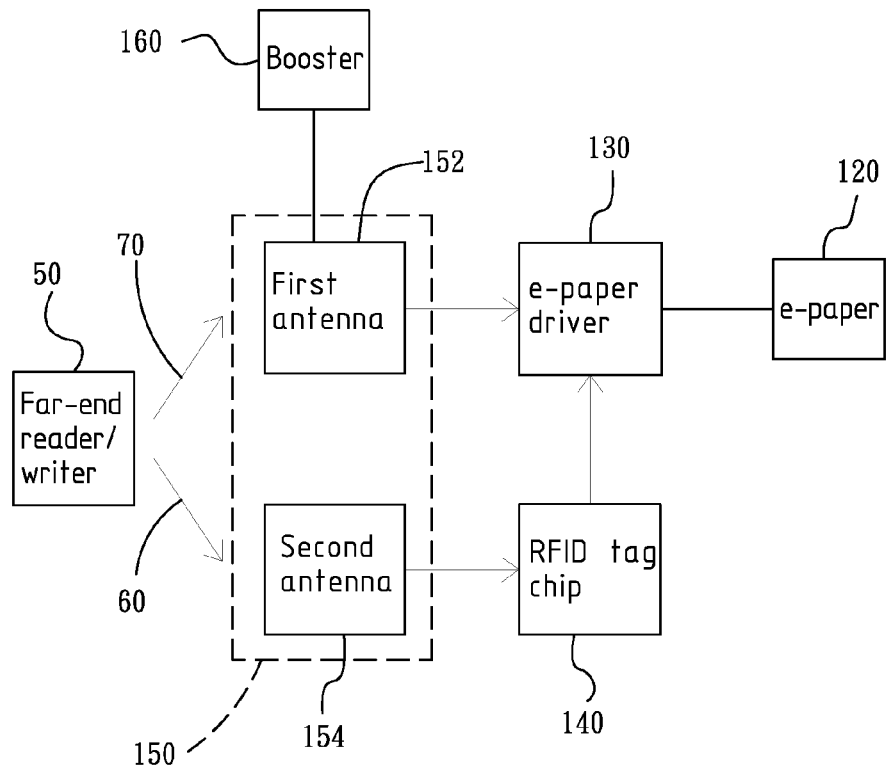
FIG. 2 is a schematic diagram of a smart card of FIG. 1.

FIG. 2 is a schematic diagram of the smart card of FIG. 1. Referring to FIG. 2, the e-paper driver 130 is electrically connected to the e-paper 120, the RFID tag chip 140 is electrically connected to the e-paper driver 130, and the receiving unit 150 is electrically connected to the e-paper driver 130 and the RFID tag chip 140. The receiving unit 150 is suitable for receiving data 60 and electric power 70 from a far-end reader/writer 50. The receiving unit 150 transfers the electric power 70 to the e-paper driver 130, and transfers the data 60 to the e-paper driver 130 through the RFID tag chip 140, so that the e-paper driver 130 can drive the e-paper 120 to display information 80 (shown in FIG. 1) by the data 60 and the electric power 70.

For example, the smart card 100 can be used to replace conventional train/bus tickets that are abandoned after use. The user can receive the data 60 and the electric power 70 provided by the far-end reader/writer 50 located at a train/bus station through the receiving unit 150 of the smart card 100, wherein the data 60 is, for example, riding information such as a train/bus number, date, a carriage number and a seat number, etc., and the e-paper 120, the e-paper driver 130 and the RFID tag chip 140 of the smart card 100 are powered by the electric power 70 to facilitate the e-paper 120 displaying the riding information for the user. Since the e-paper 120 consumes the electric power only when it changes a display image, and afterwards the e-paper 120 can continually display the image without power supplying, the riding information can be continually displayed on the e-paper 120 and is not disappeared along with time.

Furthermore, the user can possess the smart card 100, and can repeatedly bring the smart card 100 to the train/bus station to receive the riding information. Alternatively, the train/bus station can possess the smart card 100, and the user can go to the train/bus station to get the smart card 100 to receive the riding information, and after the user gets to the destination, the user returns back the smart card 100 to the train/bus station, so that the follow-up users can repeatedly use the smart card 100.

Moreover, the smart card 100 can also be used to replace conventional movie tickets that are abandoned after use. The user can receive the data 60 and the electric power 70 provided by the far-end reader/writer 50 located at a theatre through the receiving unit 150 of the smart card 100, wherein the data 60 is, for example, movie information such as a movie timetable, a date, a hall number and a seat number, etc., and the e-paper 120, the e-paper driver 130 and the RFID tag chip 140 of the smart card 100 are powered by the electric power 70 to facilitate the e-paper 120 displaying the movie information for the user. Since the e-paper 120 consumes the electric power only when it changes a display image, and afterwards the e-paper 120 can continually display the image without power supplying, the movie information can be continually displayed on the e-paper 120 and is not disappeared along with time.

Furthermore, the user can possess the smart card 100, and can repeatedly bring the smart card 100 to the theatre to receive the movie information. Alternatively, the theatre can possess the smart card 100, and the user can go to the theatre to get the smart card 100 to receive the movie information, and after the user finishes watching the movie, the user returns back the smart card 100 to the theatre, so that the follow-up users can repeatedly use the smart card 100.

In this way, the smart card 100 can be used to replace the ticket such as the train/bus ticket or the movie ticket that are abandoned after use, so as to save resources to avail environmental protection. It should be noticed that besides the train/bus tickets and the movie tickets, the smart card 100 can also be used to replace the other types of tickets that are abandoned after use, which is not limited by the present disclosure.

In detail, the receiving unit 150 of the present exemplary embodiment includes a first antenna 152 and a second antenna 154. The first antenna 152 is electrically connected to the e-paper driver 130, and the second antenna 154 is electrically connected to the RFID tag chip 140. The first antenna 152 receives the electric power 70 from the far-end reader/writer 50 wirelessly, and transfers the electric power 70 to the e-paper driver 130. The second antenna 154 receives the data 60 from the far-end reader/writer 50, and transfers the data 60 to the e-paper driver 130 through the RFID tag chip 140.

To avoid the first antenna 152 miss-receiving the data 60 from the far-end reader/writer 50, and avoid the second antenna 154 miss-receiving the electric power 70 from the far-end reader/writer 50, the first antenna 152 and the second antenna 154 are designed to be suitable for receiving electromagnetic waves having different frequencies. Therefore, the electric power 70 sent by the far-end reader/writer 50 is set to a frequency suitable for being received by the first antenna 152, and the data 60 sent by the far-end reader/writer 50 is set to a frequency suitable for being received by the second antenna 154, so that the first antenna 152 and the second antenna 154 can normally carry out their receiving tasks.

In the smart card 100 of the present exemplary embodiment, the e-paper 120 is taken as a display device, and a voltage required for driving the e-paper 120 is about 40 volts. Therefore, the smart card 100 of the present exemplary embodiment can further include a booster 160. The booster 160 is electrically connected to the first antenna 152 for boosting the electric power 70 received from the far-end reader/writer 50. However, in case that the far-end reader/writer 50 can directly provide the electric power of enough voltage, the booster 160 can be omitted, which is not limited by the present disclosure.

In summary, the smart card of the present disclosure can receive data and electric power wirelessly from the far-end reader/writer through the receiving unit, so as to power the e-paper of the smart card, and drives the e-paper to display information according to the data, so that the user can directly view the smart card to obtain the information therein. In this way, the smart card of the present disclosure can be used to replace tickets such as train/bus tickets or movie tickets that are abandoned after use, so as to save resources to avail environmental protection. Moreover, the smart card of the present disclosure can further include a booster for boosting the electric power received from the far-end reader/writer to a voltage that is great enough for driving the e-paper. In this way, the smart card is adapted to far-end readers/writers capable of providing the electric powers of various voltages.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A smart card, suitable for receiving data and electronic power from a far-end reader/writer wirelessly, the smart card comprising:
   a main body;
   an e-paper, disposed at the main body;
   an e-paper driver, disposed at the main body, having a first receiving end, a second receiving end and an output end, and the output end being electrically connected to the e-paper;
   a radio frequency identification (RFID) tag chip, disposed at the main body, having a receiving end and an output end, and the output end being electrically connected to the second receiving end of the e-paper driver;
   a receiving unit, disposed at the main body and separately electrically connected to the e-paper driver and the RFID tag chip, and receiving the data and the electric power wirelessly, wherein the receiving unit transfers the electric power to the e-paper driver without the RFID tag chip and transfers the data to the e-paper driver through the RFID tag chip, and e-paper driver drives the e-paper to display information by the data and the electric power;

wherein the e-paper consumes power only when a display image is changed and can continually display an image without additional power being supplied; and wherein the receiving unit comprises:

a first antenna, electrically connected to the first receiving end of the e-paper driver, wherein the first antenna receives the electric power wirelessly, and transfers the electronic power to the first receiving end of the e-paper driver;

a second antenna, electrically connected to the receiving end of the RFID tag chip, wherein the second antenna receives the data, and transfers the data to the second receiving end of the e-paper driver through the output end of the RFID tag chip;

a booster electrically connected to the receiving unit for boosting the electric power, and wherein the booster is electrically connected to the first antenna for boosting the electric power.

2. The smart card as claimed in claim 1, wherein the first antenna is suitable for receiving an electromagnetic wave having a first frequency, and the second antenna is suitable for receiving an electromagnetic wave having a second frequency, and the first frequency is different from the second frequency.

3. The smart card as claimed in claim 1, wherein the main body has an opening for exposing the e-paper.

* * * * *